United States Patent [19]
Udagawa et al.

[11] Patent Number: 5,798,863
[45] Date of Patent: Aug. 25, 1998

[54] IMAGE STABILIZED OPTICAL SYSTEM

[75] Inventors: Tetsuo Udagawa; Haruo Kakizawa; Kouichi Nagata; Kazuto Tanaka, all of Saitama-ken, Japan

[73] Assignee: Fuji Photo Optical Co., Ltd., Saitama-Ken, Japan

[21] Appl. No.: 433,529

[22] Filed: May 2, 1995

[30] Foreign Application Priority Data

May 10, 1994 [JP] Japan ................... 6-096525

[51] Int. Cl.[6] .................................. G02B 27/64
[52] U.S. Cl. ........................... 359/557; 359/554
[58] Field of Search .................... 359/554–557, 359/823, 896, 70, 430, 402–408, 808–813; 396/52–55

[56] References Cited

U.S. PATENT DOCUMENTS

| | | | |
|---|---|---|---|
| 2,518,632 | 8/1950 | O'Brien et al. | 359/557 |
| 3,582,180 | 6/1971 | Gass | 359/555 |
| 3,597,022 | 8/1971 | Waldron | 310/90.5 |
| 4,235,506 | 11/1980 | Saito et al. | 359/554 |
| 4,615,590 | 10/1986 | Alvarez et al. | 359/556 |
| 5,206,762 | 4/1993 | Kasahara et al. | 359/813 |
| 5,539,575 | 7/1996 | Kakizawa et al. | 359/554 |

*Primary Examiner*—Thong Nguyen
*Attorney, Agent, or Firm*—Leydig, Voit & Mayer, Ltd.

[57] ABSTRACT

An image stabilized optical system includes a casing, an objective system, an eyepiece system, a gimbal connected to the casing via a shaft and capable of oscillating, an erect prism attached to the gimbal, a motor attached to the gimbal, an inertial rotor supported by a rotating rod of the motor, and a damper attached to the gimbal. The damper includes a viscoelastic member and has a first end attached to the gimbal and a second, free end spaced from the casing and the shaft. An image can be highly stabilized by efficiently suppressing in the damper vibrations (resonance) generated in the gimbal. Further, size, weight, and cost reductions, and easy manufacture of an image stabilized optical system are attained.

20 Claims, 8 Drawing Sheets

IMAGE STABILIZED OPTICAL SYSTEM

FIELD OF THE INVENTION

The present invention relates to an image stabilized optical system comprising a damper.

RELATED BACKGROUND ART

A conventional image stabilized optical system, a system is described in U.S. Pat. No. 4,235,506 (corresponding to Japanese Patent Publication 57-37852). In the image stabilized optical system described in this reference, an oil damper is attached to a shaft, connecting a gimbal and a casing. Oil, for absorbing impacts, is sealed in the oil damper.

SUMMARY OF THE INVENTION

It is an object of the present invention to provide an image stabilized optical system that highly stabilizes an image by efficiently suppressing vibration (resonance) generated in a gimbal and the like, that achieves size, weight, and cost reductions and that is easily manufactured.

The present invention is directed to an image stabilized optical system comprising:

a casing;

an objective system and an eyepiece system attached to the casing;

a gimbal connected to the casing via a shaft so that the gimbal can oscillate in both tilting and panning directions;

an erect prism arranged between the objective system and the eyepiece system and attached to the gimbal;

a motor attached to the gimbal;

an inertial rotor supported by a rotating rod of the motor; and a damper attached to the gimbal, the damper comprising a viscoelastic member and having a first end attached to the gimbal and a second free end not connected to the casing or the shaft.

The viscoelastic member provides to a moving gimbal both a viscosity resistance force and an elastic force for drawing the gimbal toward the damper. The viscoelastic member may comprise various kinds of rubbers (e.g., natural rubber, urethane-based rubber, butyl rubber, norbornene rubber, or the like), and, preferably, comprises a silicone-based gel material.

The damper according to the present invention preferably comprises the viscoelastic member and an added weight, and the added weight is preferably attached to the gimbal via the viscoelastic member.

Further, the present invention is directed to an image stabilized optical system comprising:

a casing;

an objective system and an eyepiece system attached to the casing;

a gimbal connected to the casing via a shaft so that the gimbal can oscillate in both tilting and panning directions;

an erect prism arranged between the objective system and the eyepiece system and attached to the gimbal;

a motor attached to the gimbal;

an inertial rotor supported by a rotating rod of the motor; and a damper attached to the gimbal, the damper comprising an added weight, guide means, the guide means being attached to the gimbal and supporting the added weight so that the added weight is movable in a direction substantially parallel to an oscillating direction of the gimbal, an elastic member (e.g., a spring) for providing an elastic force to the added weight in a direction substantially parallel to the oscillating direction, and a viscous member (e.g., a grease) for providing a viscous force to the added weight in the direction substantially parallel to the oscillating direction.

The image stabilized optical system of the present invention may be applied to binoculars having two erect prisms, objective systems, and eyepiece systems.

The damper according to the present invention has both viscosity and elasticity, and its second end, opposite to the first end attached to the gimbal, is a free end separated from the casing, the shaft between the casing, and the gimbal, and does not contact them. Therefore, when the gimbal to which the damper according to the present invention is attached moves in accordance with the vibration of the casing or the like, a viscous resistance force is applied to the gimbal, since a portion near the second end of the damper especially resists moving from its still position. At the same time, an elastic force pulls the gimbal toward the damper. Therefore, the damper according to the present invention can efficiently suppress vibration (resonance) that may be generated in an oscillatable member such as the gimbal to which the damper is attached. Thus, the optical axis passing through the erect prism attached to the gimbal can be stabilized and, therefore, an image can be highly stable.

Through the use of the damper according to the present invention, vibration (resonance) is efficiently suppressed by a compact, lightweight damper as compared to, e.g., a conventional oil damper. In addition, the damper according to the present invention can be easily manufactured at low cost since it has a relatively simple structure.

Furthermore, in the damper according to the present invention, since the weight and/or the viscoelastic member can be relatively easily changed, the viscosity resistance force and the elastic force applied from the damper to the gimbal and the like can be easily and accurately adjusted. Therefore, when the damper according to the present invention is used, vibration (resonance) can be suppressed more reliably.

Therefore, in the image stabilized optical system according to the present invention, size, weight and cost reductions and easy manufacture of the system are realized in addition to accurate stabilization of an image.

In the image stabilized optical system according to the present invention, the first end of the damper is preferably attached at a position separated from the shaft for connecting the gimbal and the casing. With this arrangement, the viscous resistance force and the elastic force tend to be efficiently applied by the damper to the gimbal.

In addition, at least two dampers according to the present invention are preferably arranged symmetrically about the shaft. With this arrangement, the balance of the gimbal to which the dampers are attached tends to be held more reliably.

Furthermore, in the damper, the surface area of the second end is preferably larger than that of the first end. With this arrangement, since the center of gravity of the damper is shifted toward the second end, the viscous resistance force and the elastic force tend to be efficiently applied from the damper to the gimbal.

According to one aspect of the image stabilized optical system of the present invention, the gimbal comprises an outer gimbal, an inner gimbal, a first shaft connecting the inner gimbal with the outer gimbal, and a second shaft connecting the outer gimbal with the casing, wherein the axes of rotation of the first shaft and the second shaft intersect at a right angle, and the erect prism, the motor, and the inertial rotor are attached to the inner gimbal. The damper according to the present invention is attached to the outer gimbal and/or the inner gimbal.

According to another aspect of the image stabilized optical system of the present invention, the gimbal comprises an outer gimbal, a plurality of inner gimbals, first shafts connecting the inner gimbals with the outer gimbal, and a second shaft connecting the outer gimbal with the casing, the axes of rotation of the first shaft and the second shaft intersecting at a right angle, and a link connecting the plurality of inner gimbals to each other to obtain equal oscillating angles of the inner gimbals. The erect prism, the motor, and the inertial rotor are attached to the plurality of inner gimbals, respectively. The damper according to the present invention is attached to at least one of the outer gimbal and the inner gimbals.

DESCRIPTION OF THE PREFERRED EMBODIMENTS

Figure 1:
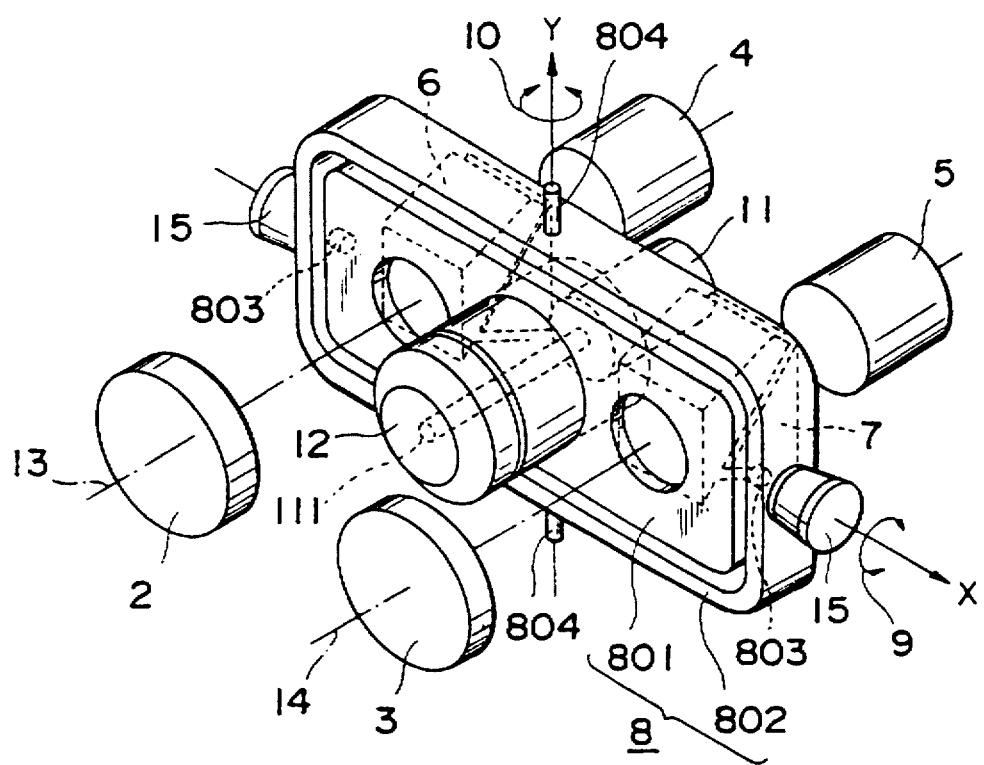
FIG. 1 is a perspective view showing the principle of an embodiment of an image stabilized optical system according to the present invention.

The preferred embodiments of the present invention are described with reference to the accompanying drawings. The same reference numerals denote the same parts throughout the drawings.

Figure 2:
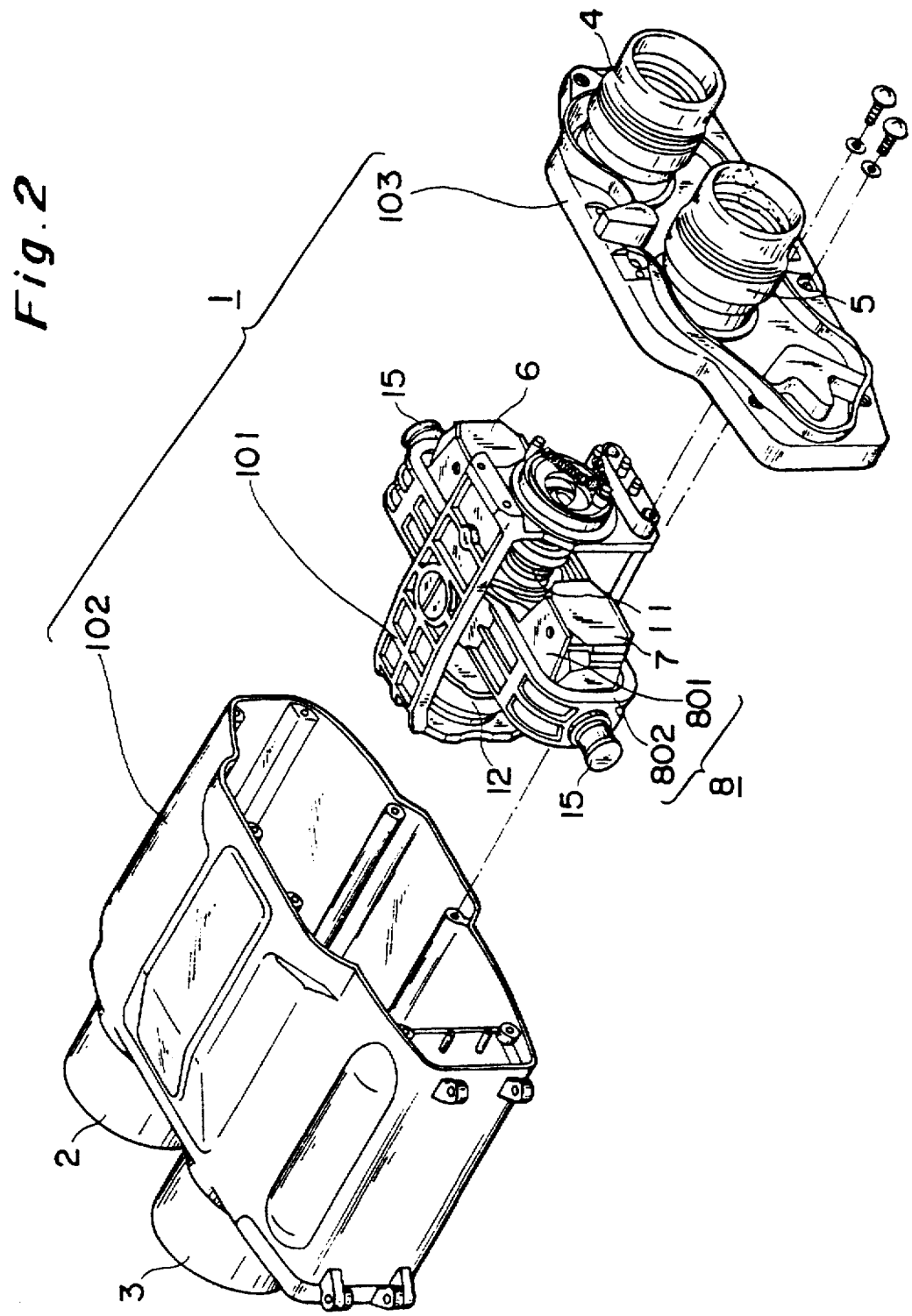
FIG. 2 is an exploded perspective view showing an embodiment of the image stabilized optical system according to the present invention.
Figure 3:
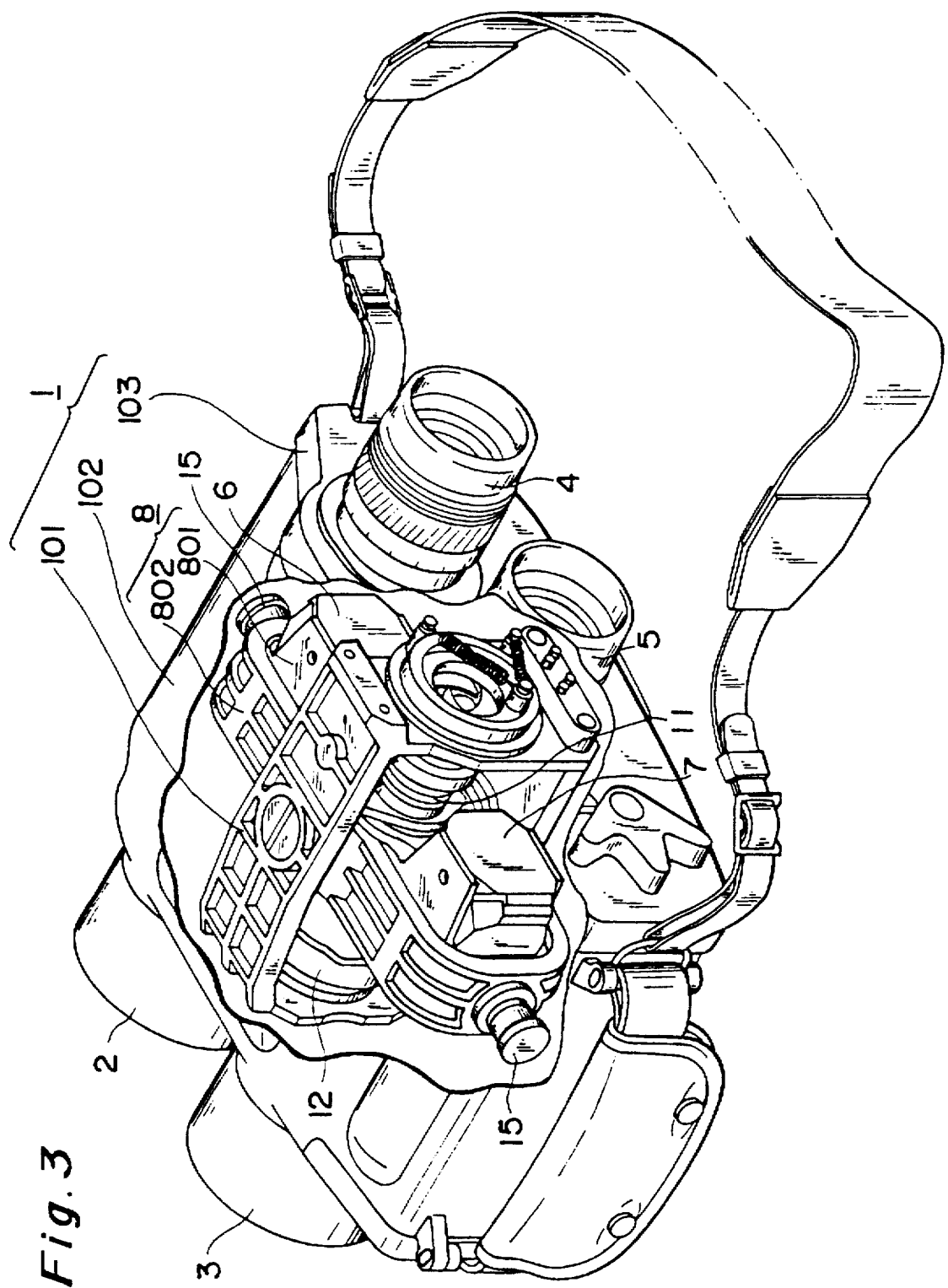
FIG. 3 is a partially cutaway perspective view of the image stabilized optical system shown in FIG. 2.

An embodiment of an image stabilized optical system of the present invention, more specifically, binoculars with an image stabilization function, is described below with reference to FIGS. 1 to 3.

The image stabilized optical system of the present invention comprises a casing 1, objective systems 2 and 3, and eyepiece systems 4 and 5. The objective systems 2 and 3 and the eyepiece systems 4 and 5 are attached to the casing 1. The casing 1 includes an inner casing 101, an objective side casing 102, and an eyepiece side casing 103.

Erect prisms 6 and 7 are respectively arranged between the objective systems 2 and 3 and the eyepiece systems 4 and 5. The erect prisms 6 and 7 are fixed to a two-degree-of-freedom gimbal 8 which is connected to the casing 1 via a first shaft and a second shaft, axes of rotation of the first shaft and the second shaft intersecting at a right angle.

More specifically, the gimbal 8 comprises an inner gimbal 801 and an outer gimbal 802. The inner gimbal 801 is connected to the outer gimbal 802 via a set of two first shafts 803, the rotational axes of which extend in a direction substantially parallel to the X-axis in FIG. 1. Therefore, the inner gimbal 801 is capable of oscillating in a tilting direction 9 with respect to the outer gimbal 802. Further, the outer gimbal 802 is connected to the casing 1 via a set of second shafts 804, the rotational axes of which extend in a direction substantially parallel to the Y-axis in FIG. 1. Therefore, the outer gimbal 802 is capable of oscillating in a panning direction 10 with respect to the casing 1. The erect prisms 6 and 7 are fixed to the inner gimbal 801 which is capable of oscillating in both the tilting direction 9 and the panning direction 10, as described above.

Note that the inner gimbal 801 may be connected to the outer gimbal 802 via a set of shafts (not shown), the rotational axes of which extend in a direction substantially parallel to the Y-axis for oscillating in the panning direction 10, and the outer gimbal 802 may be connected to the casing 1 via a set of shafts (not shown), the rotational axes of which extend in a direction substantially parallel to the X-axis for oscillating in the tilting direction 9.

A motor 11 having a rotating rod 111 is fixed to the gimbal 8 (inner gimbal 801). Further, an inertial rotor 12 is supported by the rotating rod 111 of the motor 11, and the inertial rotor 12 can be rotated at high speed by the driving force of the motor 11.

Since the direction (a direction substantially parallel to the rotating rod 111) of the axis of rotation of the inertial rotor 12 in this arrangement will not change with respect to an inertial frame of reference, even when a vibration acts on the casing 1, the direction of the inner gimbal 801 will not change with respect to the inertial frame of reference. Therefore, the directions of the erect prisms 6 and 7 will not change with respect to the inertial frame of reference. As described above, the directions of the erect prisms 6 and 7 arranged between the objective systems 2 and 3 and the eyepiece systems 4 and 5 will not change even when a vibration acts on the casing 1. Therefore, optical axes 13 and 14 passing through the erect prisms 6 and 7 are stabilized against a disturbance, such as hand vibration, and the image stabilization function of the optical system of the present invention is achieved.

The image stabilized optical system (using an oil damper) described in U.S. Pat. No. 4,235,506 (corresponding to Japanese Patent Publication No. 57-37852) is incorporated in the present specification by reference, particularly with respect to the image stabilization mechanism and the arrangement of the image stabilized optical system.

The image stabilized optical system of the present invention comprises a damper 15 attached to the gimbal 8. The damper 15 according to the present invention comprises a viscoelastic member 16, as shown in, e.g., FIG. 4. As shown in FIGS. 1 to 3, one end (first end 151) of the damper 15 is attached to the gimbal 8 (outer gimbal 802), and the other end (second end 152) is a free end spaced from and not connected to the casing 1, the shafts 803 and 804, and the like. More specifically, the second end 152 of the damper 15 is spaced from the casing 1, from the second shafts 804 between the casing 1, and from the gimbal 8, and the like, so as not to contact them. The damper 15 with the above arrangement applies to the gimbal 8 not only a viscous resistance force but also an elastic force drawing the gimbal 8 toward the damper 15 when the gimbal 8 is moved.

Note that the viscoelasticity mentioned here has both a nature (viscosity) for generating a resistance force proportional to a speed of an object and a nature (elasticity) for generating a force proportional to a displacement of an object (a force in a direction opposite to the direction of the displacement). The viscoelastic member according to the present invention is not particularly limited, and various kinds of rubbers (e.g., natural rubber, urethane-based rubber, butyl rubber, norbornene rubber, or the like) may be used. In particular, a silicone-based gel material (e.g., trade name: $\alpha_{GEL}$ (registered mark), $\theta_{GEL}$ (registered mark), available from Siegel K.K.) is preferably used. The silicone-based gel material has a lower resonance point and factor (Q), a short vibration attenuation time, very small temperature dependencies of various characteristics, high climate and chemical resistance, and a small permanent compression set, as compared with the rubbers. Therefore, the use of the silicone-based gel material is suitable for achieving further size and weight reductions of the damper.

Figure 4:
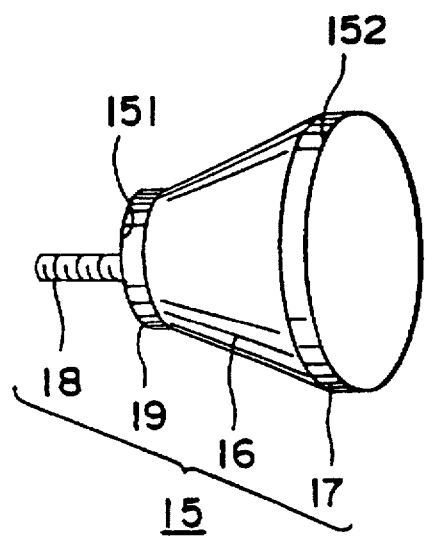
FIG. 4 is a perspective view showing an embodiment of a damper according to the present invention.

The detailed arrangement of the damper 15 according to the present invention is not particularly limited. The damper 15 preferably has a certain weight in addition to its viscosity and elasticity. Therefore, the damper 15 according to the present invention preferably comprises the viscoelastic member 16 and an added weight 17 (consisting of, e.g., a metal), as shown in FIG. 4. In this case, the added weight 17 is attached to the gimbal 8 via the viscoelastic member 16. The use of the added weight 17 is suitable for achieving further size and weight reductions of the damper. The damper 15 shown in FIG. 4 further comprises a disk-shaped base 19 having a threaded portion 18, and the base 19 is fixed to the gimbal 8 by threadedly engaging the threaded portion 18 with a threaded hole (not shown) in the gimbal 8. The viscoelastic member 16 and the disk-shaped added weight 17 are adhered, in turn, to the base portion 19.

Figure 5:
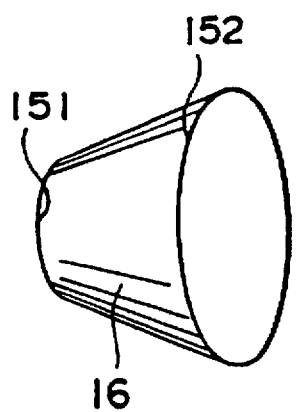
FIG. 5 is a perspective view showing another embodiment of a damper according to the present invention.

Since the viscoelastic member 16 has its own weight, the added weight 17 is not always necessary. The damper 15 according to the present invention may consist of a viscoelastic member 16 without any added weight, as shown in FIG. 5. Further, the method of attaching the damper 15 to the gimbal 8 is not particularly limited. For example, the first end 151 of the viscoelastic member 16 may be directly adhered to the gimbal 8, as shown in FIG. 5.

The damper 15 shown in FIG. 4 has a circular truncated cone shape. However, the shape of the damper 15 according to the present invention is not particularly limited. For example, the damper 15 may have a columnar shape, a prismatic shape, a pyramidal shape, a prismoidal shape, or the like. In the damper 15 according to the present invention, the surface area of the second end 152 is preferably larger than that of the first end 151. With this arrangement, since the center of gravity of the damper 15 is shifted toward the second end 152, the viscous resistance force and the elastic force tend to be efficiently applied from the damper 15 to the gimbal 8.

Figure 6:
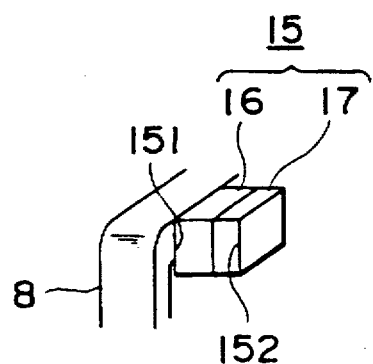
FIG. 6 is a perspective view showing still another embodiment of a damper according to the present invention.
Figure 7:
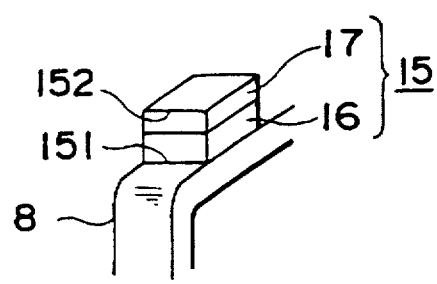
FIG. 7 is a perspective view showing still another embodiment of a damper according to the present invention.
Figure 8:
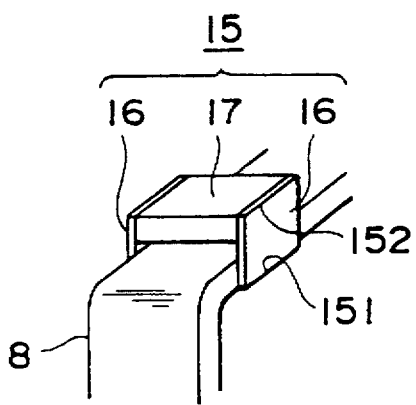
FIG. 8 is a perspective view showing still another embodiment of a damper according to the present invention.

FIGS. 6 to 8 show other embodiments of the damper according to the present invention. A damper 15 shown in FIG. 6 comprises a viscoelastic member (e.g., a silicone-based gel material) 16 attached to the side surface of a gimbal 8 (e.g., an outer gimbal 802), and an added weight 17 adhered to the viscoelastic member 16. The damper 15 shown in FIG. 7 comprises a viscoelastic member 16 attached to the upper surface of a gimbal 8, and an added weight 17 adhered to the viscoelastic member 16. The damper 15 shown in FIG. 8 comprises a set of two viscoelastic member plates (e.g., rubber plates) attached to the two side surfaces of a gimbal 8, and an added weight 17 adhered between these viscoelastic members 16. Each of these dampers 15 has a first end 151 that is attached to the gimbal 8, and a second end 152 (free end) spaced from the casing 1, the shafts 803 and 804, and the like.

Although various dampers comprising viscoelastic members according to the present invention have been described, the damper according to the present invention is not particularly limited as long as it can apply to the gimbal not only a viscous resistance force but also an elastic force for drawing the gimbal toward the damper when the gimbal is moved. As a damper according to the present invention which does not comprise a viscoelastic member, the damper shown in FIG. 9 may be used.

Figure 9:
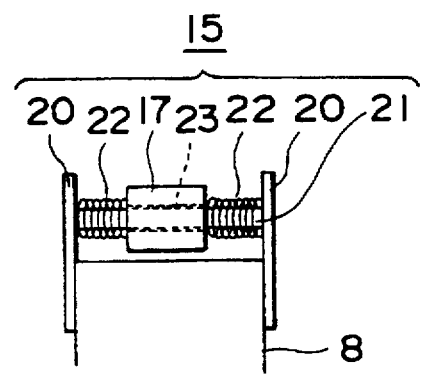
FIG. 9 is a front view showing still another embodiment of a damper according to the present invention.

The damper 15 shown in FIG. 9 comprises a set of two plates (e.g., metal plates) 20 attached to two respective side surfaces of a gimbal 8, and a guide rod 21 extending between these plates 20. The plates 20 and the guide rod 21 constitute guide means. An added weight 17 is movably mounted on the guide rod 21. The added weight 17 shown in FIG. 9 has a pipe shape. Furthermore, a set of elastic members (e.g., springs) 22 are arranged between the added weight 17 and the two metal plates 20, and a viscous member (e.g., grease) 23 is inserted between the added weight 17 and the guide rod 21. The damper 15 shown in FIG. 9 is attached to the gimbal 8, so that the added weight 17 is movable in a direction substantially parallel to the oscillating direction of the gimbal 8. With this arrangement, the elastic members 22 apply an elastic force to the added weight 17 in the direction substantially parallel to the oscillating direction, and the viscous member 23 applies a viscous force to the added weight 17 in a direction substantially parallel to the oscillating direction. Therefore, in the damper 15 shown in FIG. 9, the elastic members 22 and the viscous member 23 have the same role as the viscoelastic member.

Each damper 15 according to the present invention has a compact, lightweight structure and can be easily manufactured at low cost, as compared to a conventional oil damper. The damper 15 according to the present invention applies to the gimbal not only a viscous resistance force but also an elastic force for drawing the gimbal toward the damper when the gimbal is moved. Thus, vibration (resonance) in the gimbal is suppressed by the damper 15 according to the present invention. Therefore, when the damper according to the present invention is used, size, weight, and cost reductions and easy manufacture of an image stabilized optical system are realized and an image is highly stabilized.

Various actual characteristics (e.g., actual viscosity and elasticity of the viscoelastic member, actual weight of the added weight, and the like) of the damper according to the present invention will be appropriately selected in correspondence with the weights of the gimbal and various members attached to it, the attachment position of the damper, and the like.

Further, the motions of the inner gimbal 801 and the outer gimbal 802 are not independent from each other but are related to each other. Therefore, the damper 15 according to the present invention need only be attached to one of the inner and outer gimbals 801 and 802, and by suppressing the vibration of one gimbal, the vibration of the other gimbal can be suppressed. Therefore, the attachment position of the damper 15 according to the present invention is not particularly limited. The first end 151 of the damper 15 is preferably attached at a position separated from the shaft 804 connecting the gimbal 8 with the casing 1. With this arrangement, the viscous resistance force and the elastic force tend to be efficiently applied by the damper 15 to the gimbal 8.

Further, at least two dampers 15 according to the present invention are preferably arranged symmetrically with respect to one of the shafts 803 and 804. With this arrangement, the balance of the gimbal 8 to which the dampers 15 are fixed tends to be held more reliably.

A mechanism for suppressing vibration (resonance) generated in oscillatable members, such as the gimbal, and improving the stability of the optical axes passing through the erect prisms in the image stabilized optical system according to the present invention is analyzed below.

First, the motion of a system associated with an image stabilized optical system that does not comprise any damper is analyzed. Assume that the torque applied to the inner gimbal 801 is represented by Tig, the torque applied to the outer gimbal 802 is represented by Tog, the angle of the inner gimbal 801 is represented by θig, the angle of the outer gimbal 802 is represented by θog, the inertial mass about the bearing of the inner gimbal 801 is represented by Iig, the inertial mass about the bearing of the outer gimbal 802 is represented by Iog, and the gyro moment of the inertial rotor 12 is represented by H. The motions of the inner and outer gimbals 801 and 802 are described by equations of motion as follows:

The precession of a gyro is:

$$Tig = H\frac{d\theta og}{dt} \quad (1)$$

$$-Tog = H\frac{d\theta ig}{dt} \quad (2)$$

Also, the relationships between the torque, inertial mass, and angular acceleration are:

$$Tig = Iig\frac{d^2\theta ig}{dt^2} \quad (3)$$

$$Tog = Iog\frac{d^2\theta og}{dt^2} \quad (4)$$

From formulas (1) to (4), the relationship between the torque and angle is determined as follows:

$$H\frac{d\theta og}{dt} = -\frac{Iig Iog}{H} \frac{d^2}{dt^2}\left(\frac{d\theta og}{dt}\right)$$

As can be understood from this formula, this system has a natural frequency, and when a torque is applied to the system by the bearing frictional force, the system oscillates at a resonance frequency ω given by:

$$\omega = \sqrt{\frac{H^2}{Iig Iog}} = \frac{H}{\sqrt{Iig Iog}}$$

Figure 10:
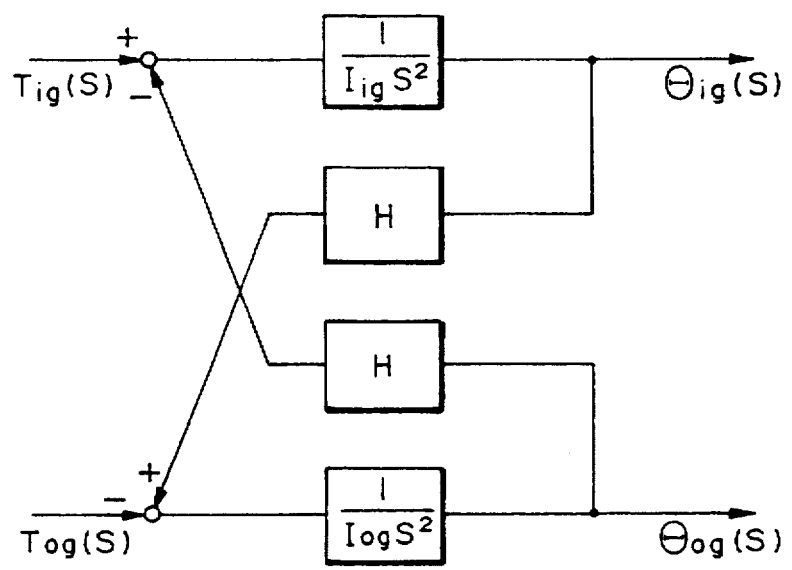
FIG. 10 is a diagram illustrating the motion, in a Laplace transform region, of an image stabilized optical system without a damper.

The frequency ω can also be calculated as follows. For the sake of easy understanding, this system is expressed, as shown in FIG. 10, using a mechanical transfer function in a Laplace transfer form and a block diagram. When the relationship between the torque and the angle is obtained from this expression, the following formula is obtained:

$$\frac{\Theta ig(S)}{Tig(S)} = \frac{1}{\frac{Iig Iog}{H^2}S^4 + 1} \times \frac{Iog}{H^2}$$

Therefore, as can be seen from this formula, the above-mentioned system similarly has a resonance frequency ω given by:

$$\omega = \frac{H}{\sqrt{Iig Iog}}$$

Figure 11:
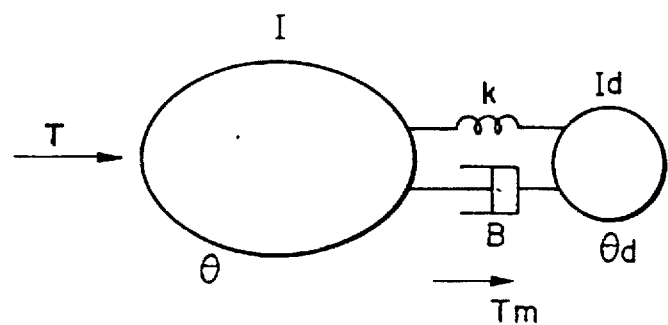
FIG. 11 is a schematic diagram illustrating in a simplified form a system in which the damper according to the present invention is attached to a gimbal.

The motion of a system associated with an image stabilized optical system in which the damper 15 according to the present invention is attached to the outer gimbal 802 is be analyzed below. FIG. 11 is a diagram simply showing this system. Referring to FIG. 11, Id and θd are respectively the inertial mass and angle of the added weight 17, k and B are respectively coefficients representing the elasticity and viscosity of the viscoelastic member 16, I and θ are respectively the inertial mass and angle of the outer gimbal 802, and T and Tm are respectively the torques applied to the outer gimbal 802 and the added weight 17.

The motion of this system is described using equations of motion as follows:

$$T + Tm = I\frac{d^2\theta}{dt^2}$$

$$Tm = k(\theta - \theta d) + B\left(\frac{d\theta}{dt} - \frac{d\theta d}{dt}\right)$$

$$Id\frac{d^2\theta d}{dt^2} = k(\theta - \theta d) + B\left(\frac{d\theta}{dt} - \frac{d\theta d}{dt}\right)$$

The above formulas are Laplace-transformed to:

$$T(S) + Tm(S) = IS^2$$

$$Tm(S) = k\{\Theta(S) - \Theta d(S)\} + B\{\Theta(S)S - \Theta d(S)S\}$$

$$Id\Theta d(S)S^2 = k\{\Theta(S) - \Theta d(S)\} + B\{\Theta(S)S - \Theta d(S)S\}$$

Furthermore, when the formulas are arranged in association with the relationship between the torque and angle, the following formula is obtained:

$$\frac{\Theta(S)}{T(S)} = \frac{1}{IS^2 - \frac{IdS^2(BS+k)}{IdS^2 + BS + k}} = D(S)$$

Figure 12:
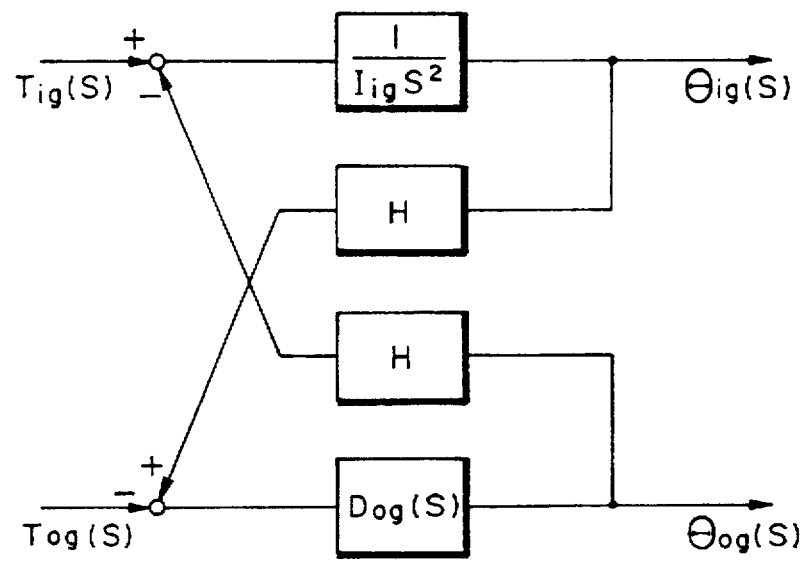
FIG. 12 is a diagram illustrating the motion, in a Laplace transform region, of an image stabilized optical system including a damper according to the present invention.

Using this result, the motion of a system associated with an image stabilized optical system in which the damper 15 according to the present invention is attached to the outer gimbal 802 is analyzed. This system is expressed, as shown in FIG. 12, using a mechanical transfer function in a Laplace transform form and a block diagram. In FIG. 12, Dog(s)= D(s). From this expression, the relationship between the torque and angle is determined by:

$$\frac{\Theta ig(S)}{Tig(S)} = \frac{1}{ligS^2 + Dog(S)H^2}$$

$$= \frac{1}{ligS^2 + \frac{H^2}{logS^2 - \frac{IdS^2(BS+k)}{IdS^2 + BS + k}}}$$

Therefore, as can be seen from the above formula, in the image stabilized optical system of the present invention in which the damper 15 according to the present invention is attached by appropriately selecting the inertial mass Id of the added weight 17, and the elasticity k and viscosity B of the viscoelastic member 16, the Q (quality factor) at the resonance point ω can be suppressed. As described above, in the image stabilized optical system of the present invention, the vibration (resonance) of the gimbal and the like due to a disturbance applied to the casing can be suppressed, and stability of the optical axes passing through the erect prisms can be improved. Further, as shown in FIG. 12, the motions of the inner and outer gimbals 801 and 802 are not independent of each other but are related to each other. Therefore, the damper 15 according to the present invention need only be attached to one of the inner and outer gimbals 801 and 802, and, by suppressing the vibration of one gimbal, the vibration of the other gimbal can be suppressed.

As the image stabilized optical system of the present invention, a system in which the erect prisms 6 and 7, the motor 11, and the inertial rotor 12 are fixed to the single inner gimbal 801 has been described. However, the image stabilized optical system of the present invention is not particularly limited to this arrangement.

Figure 13:
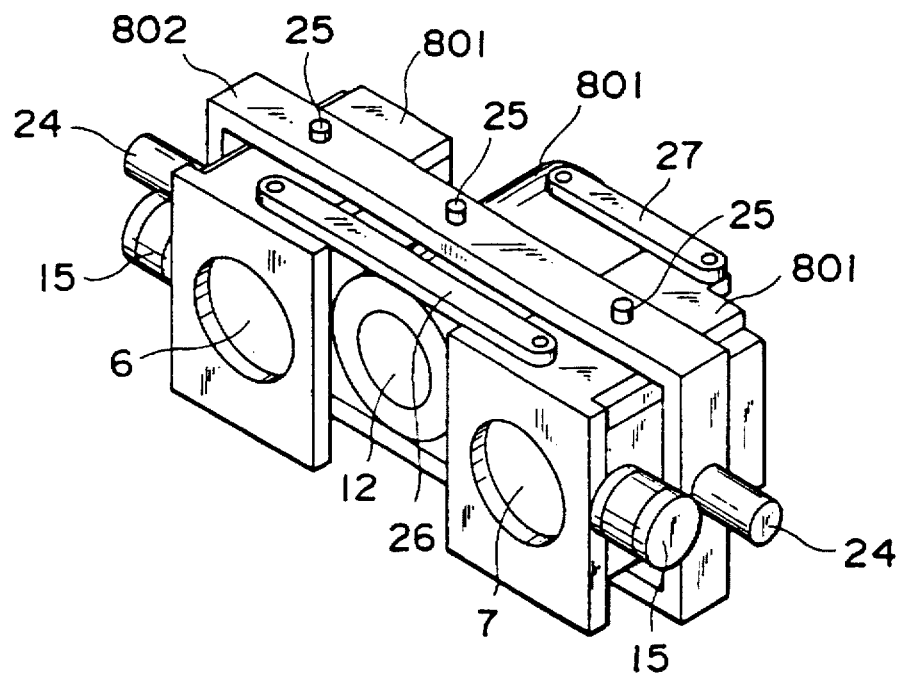
FIG. 13 is a perspective view showing another embodiment of an image stabilized optical system according to the present invention.
Figure 14:
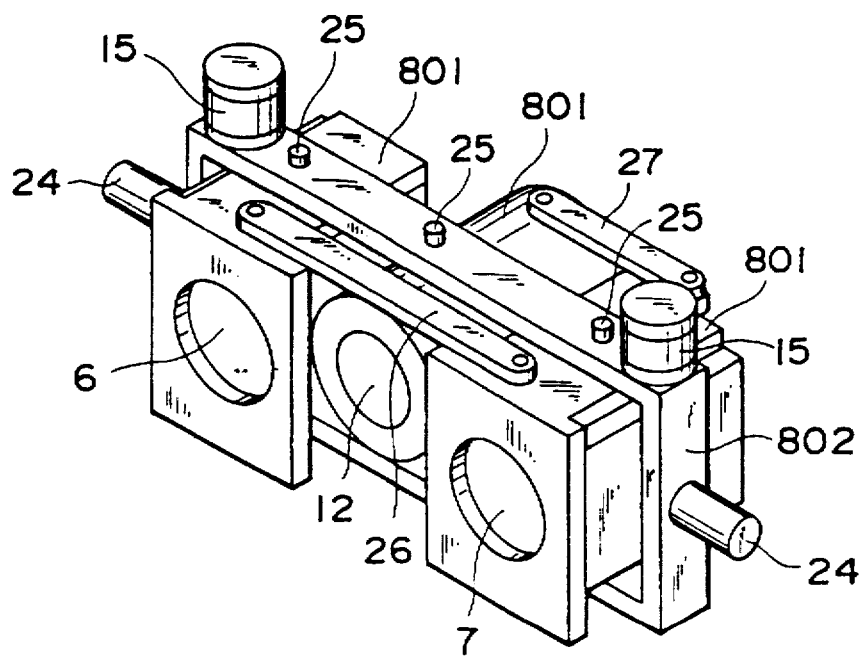
FIG. 14 is a perspective view showing still another embodiment of an image stabilized optical system according to the present invention.

FIGS. 13 and 14 show other embodiments of the image stabilized optical system of the present invention (more specifically, binoculars with an image stabilization function). In each of the image stabilized optical systems shown in FIGS. 13 and 14, an outer gimbal 802 is connected to a casing (not shown) via a set of second shafts 24 for oscillating in the tilting direction. Further, each of the image stabilized optical systems shown in FIGS. 13 and 14 comprises inner gimbals 801 divided into three parts, and these inner gimbals 801 are each connected to the outer gimbal 802 via a set of first shafts 25 for oscillating in the panning direction. The axes of rotation of the first shaft 25 and the second shaft 24 intersect at a right angle. Two erect prisms 6 and 7 are respectively fixed to the left and right inner gimbals 801, and a motor 11 and an inertial rotor 12 are fixed to the central inner gimbal 801. With this arrangement, the erect prisms 6 and 7, the motor 11 and the inertial rotor 12 can oscillate in the tilting and panning directions with respect to the casing.

Although not shown, two objective systems and two eyepiece systems are respectively attached to the casing. The two erect prisms 6 and 7 are respectively arranged between the corresponding pairs of the objective systems and the eyepiece systems. The inertial rotor 12 can be rotated at high speed by the driving force of the motor 11.

A link 26 connects the right and left inner gimbals 801, so that the oscillating angles, in the panning direction, of the two erect prisms 6 and 7 are equal to each other. Further, a link 27 connects the right or left inner gimbal 801 and the central inner gimbal 801, so that the oscillating angles, in the panning direction, of the motor 11 and the inertial rotor 12 are equal to those of the erect prisms 6 and 7.

In each of the image stabilized optical systems shown in FIGS. 13 and 14, the dampers 15 according to the present invention are attached to at least one of the oscillatable members, e.g., at least one member selected from the group consisting of the inner and outer gimbals 801 and 802 and the links 26 and 27. In the embodiment shown in FIG. 13, the dampers 15 are attached to opposite side surfaces of the left and right inner gimbals 801 (erect prisms 6 and 7). In the embodiment shown in FIG. 14, the dampers 15 are attached to the upper surface of the outer gimbal 802. As the damper 15, the dampers shown in FIGS. 4 to 9 may be used. Furthermore, the dampers 15 are preferably attached at positions symmetrical to the center line of the binoculars, as shown in FIGS. 13 and 14, since it is convenient to maintain the balance of the gimbal.

In the image stabilized optical systems shown in FIGS. 13 and 14 as well, the Q (quality factor) at the resonance point ω can be suppressed as in the analysis previously described. Therefore, the vibration (resonance) of the gimbal and the like due to a disturbance applied to the casing can be suppressed, and the stability of the optical axes passing through the erect prisms can be improved.

Although, in the described embodiments, binoculars with an image stabilization function have been shown, the image stabilized optical system of the present invention may be applied to other optical systems with an image stabilization function, such as telescopes, cameras, and the like.

As described above, in the image stabilized optical system of the present invention, a damper applies to a moving gimbal not only a viscous resistance force but also an elastic force drawing the gimbal toward the damper. The damper is attached to the gimbal. Therefore, vibration (resonance) generated in the gimbal and the like can be efficiently suppressed. When a damper according to the present invention is used, an image can be highly stabilized by efficiently suppressing vibration in oscillatable members, such as the gimbal, the erect prisms, the inertial rotor, and the like. Further, each of the dampers according to the present invention has a compact, lightweight structure as compared to a conventional oil damper and are easily manufactured at low cost. Therefore, when the damper according to the present invention is used, size, weight, and cost reductions and easy manufacture of an image stabilized optical system can be attained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An image stabilized optical system comprising:

a casing;

an objective system and an eyepiece system attached to said casing;

a first shaft;

a gimbal connected to said casing via said first shaft, said gimbal being capable of oscillating in both tilting and panning directions;

an erect prism arranged between said objective system and said eyepiece system, and attached to said gimbal;

a motor attached to said gimbal;

an inertial rotor supported by a rotating rod of said motor; and a damper attached to said gimbal, said damper comprising a viscoelastic member, having a first end attached to said gimbal and a second, free end not connected to said casing or to said first shaft.

2. The system according to claim 1, wherein said viscoelastic member comprises a silicone gel.

3. The system according to claim 1, wherein said damper comprises an added weight attached to said viscoelastic member.

4. The system according to claim 3, wherein said added weight comprises a metal.

5. The system according to claim 1, wherein said damper comprises a base having a screw and an added weight, said viscoelastic member being sandwiched between said base and said added weight and said gimbal having a threaded hole engaging said screw.

6. The system according to claim 1, wherein the first end of said damper is attached to said gimbal at a position separated from said first shaft.

7. The system according to claim 1, wherein:
said system comprises at least two dampers attached to said gimbal, each of said dampers comprising, a viscoelastic member, having a first end attached to said gimbal and a second end spaced from said casing and from said first shaft, said at least two dampers being arranged symmetrically relative to said first shaft.

8. The system according to claim 1, wherein said gimbal comprises an outer gimbal, an inner gimbal, a second shaft connecting said inner gimbal to said outer gimbal, said first shaft connecting said outer gimbal with said casing, axes of rotation of said first shaft and said second shaft intersecting at a right angle, and said erect prism, said motor, and said inertial rotor are attached to said inner gimbal.

9. The system according to claim 1, wherein said system comprises two of said erect prisms, said objective systems, and said eyepiece systems.

10. The system according to claim 1, wherein said gimbal comprises an outer gimbal, a plurality of inner gimbals, respective second shafts connecting said inner gimbals to said outer gimbal, said first shaft connecting said outer gimbal with said casing, axes of rotation of said first shaft and said second shafts intersecting at a right angle, and a link connecting said plurality of inner gimbals, so that said plurality of inner gimbals have equal oscillating angles, said erect prisms, said motor, and said inertial rotor being attached to respective inner gimbals.

11. The system according to claim 10, wherein said damper is attached to at least one of said outer gimbal and said inner gimbals.

12. An image stabilized optical system comprising:
a casing;
an objective system and an eyepiece system attached to said casing;
a first shaft;
a gimbal connected to said casing via said first shaft, said gimbal being capable of oscillating in both tilting and panning directions;
an erect prism arranged between said objective system and said eyepiece system, and attached to said gimbal;
a motor attached to said gimbal;
an inertial rotor supported by a rotating rod of said motor; and
a damper attached to said gimbal, said damper comprising an added weight, guide means attached to said gimbal and supporting said added weight so that said added weight is movable substantially parallel to an oscillating direction of said gimbal, an elastic member applying an elastic force to said added weight substantially parallel to the oscillating direction, and a viscous member applying a viscous force to said added weight substantially parallel to the oscillating direction.

13. A system according to claim 12, wherein said elastic member comprises a spring, and said viscous member comprises a grease.

14. A system according to claim 12, wherein said added weight comprises a metal.

15. The system according to claim 12, wherein said damper has a first end attached to said gimbal at a position separated from said first shaft.

16. The system according to claim 12, wherein:
said system comprises at least two dampers attached to said gimbal, each of said dampers comprising an added weight, guide means attached to said gimbal and supporting said added weight so that said added weight is movable substantially parallel to an oscillating direction of said gimbal, an elastic member applying an elastic force to said added weight substantially parallel to the oscillating direction, and a viscous member applying a viscous force to said added weight substantially parallel to the oscillating direction, said at least two dampers being arranged symmetrically relative to said first shaft.

17. The system according to claim 12, wherein said gimbal comprises an outer gimbal, an inner gimbal, a second shaft connecting said inner gimbal to said outer gimbal, said first shaft connecting said outer gimbal with said casing, axes of rotation of said first shaft and said second shaft intersecting at a right angle, and said erect prism, said motor, and said inertial rotor are attached to said inner gimbal.

18. The system according to claim 12, wherein said system comprises two of said erect prisms, said objective systems, and said eyepiece systems.

19. The system according to claim 12, wherein said gimbal comprises an outer gimbal, a plurality of inner gimbals, respective second shafts connecting said inner gimbals to said outer gimbal, said first shaft connecting said outer gimbal with said casing, axes of rotation of said first shaft and said second shafts intersecting at a right angle, and a link connecting said plurality of inner gimbals, so that said plurality of inner gimbals have equal oscillating angles, said erect prisms, said motor, and said inertial rotor being attached to respective inner gimbals.

20. The system according to claim 19, wherein said damper is attached to at least one of said outer gimbal and said inner gimbals.

\* \* \* \* \*